United States Patent
Mane et al.

(10) Patent No.: US 11,645,332 B2
(45) Date of Patent: May 9, 2023

(54) SYSTEM AND METHOD FOR CLUSTERING DOCUMENTS

(71) Applicant: Genpact Luxembourg S.à r.l. II, Luxembourg (LU)

(72) Inventors: Shishir Mane, Pune (IN); Pradip Rathode, Nilanga (IN)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 274 days.

(21) Appl. No.: 17/035,357

(22) Filed: Sep. 28, 2020

(65) Prior Publication Data
US 2022/0100797 A1   Mar. 31, 2022

(51) Int. Cl.
*G06F 16/81*   (2019.01)
*G06F 16/906*   (2019.01)
*G06N 20/00*   (2019.01)

(52) U.S. Cl.
CPC ............ *G06F 16/81* (2019.01); *G06F 16/906* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2007/0165904 A1* | 7/2007 | Nudd | G06Q 20/20 382/305 |
| 2009/0037487 A1* | 2/2009 | Fan | G06F 16/335 |
| 2010/0312725 A1* | 12/2010 | Privault | G06N 5/043 706/54 |
| 2020/0327285 A1* | 10/2020 | Cox | G06F 16/90348 |

* cited by examiner

*Primary Examiner* — Scott A. Waldron
(74) *Attorney, Agent, or Firm* — Goodwin Procter LLP

(57) ABSTRACT

A method and system are provided for classifying semi-structured documents. According to one embodiment, the method includes accessing a number of documents, and identifying in each of the documents pairs of character segments. The method also includes generating a map of unique identified segment pairs across all documents in the several documents. The method further includes generating for each of the several documents a respective feature vector based on one or more unique pair of segments in the map that are also identified in the document, and clustering the plurality of documents into a plurality of clusters, using the feature vectors.

22 Claims, 3 Drawing Sheets

*Template - 1* 100

First Name: John
Last Name: Doe
Address: 31, Some Avenue,
City, State - <Zip>

| S. No. | Item Description | Qty | Cost |
|---|---|---|---|
| 1 | Description for item 1 | 1 | $1,000.0 |
| 2 | Description for item 2 | 2 | $20,000.0 |
| 3 | Description for item 3 | 3 | $3,000.0 |
|   | | Total Amount | $24,000.0 |

FIG. 1A

*Template - 2* 150

| First Name | Last Name | City |
|---|---|---|
| John | Doe | Boston |

| S. No. | Product Details | Qty | Cost |
|---|---|---|---|
| 1 | Description for item 1 | 1 | $1,000.0 |
| 2 | Description for item 2 | 2 | $20,000.0 |
| 3 | Description for item 3 | 3 | $3,000.0 |
|   | | Total Amount | $24,000.0 |

FIG. 1B

SYSTEM AND METHOD FOR CLUSTERING DOCUMENTS

FIELD

This disclosure generally relates to clustering techniques and, in particular, to clustering techniques for classifying documents based on the document layout structure.

BACKGROUND

In many applications, ranging widely from manufacturing, scientific discovery, banking, accounting, medical diagnosis and treatment, etc., a large numbers of documents are generated and exchanged. Examples of such documents in the manufacturing context include detailed drawings of machine parts, description of chemical formulae or processing recipes. In the fields of scientific discovery and medical diagnosis and treatment, the documents may include images, such as radar or sonar images, ultra-sound or magnetic resonance imaging (MRI) images, lab reports, etc. In the fields of banking and accounting, examples of documents include bank statements, invoices, purchasing orders, etc.

In many situations, a large number of documents need to be processed in a short time. For example, a doctor's office often needs to deliver reports received from different laboratories (labs), where different labs perform different types of analyses, to the right doctor(s). Specifically, a diabetes specialist (say Doctor A) may generally recommend one type of blood testing from one particular lab (say lab X), while a renal disease specialist (say Doctor B) may usually require a different type of blood testing from a different lab (say lab Y). Upon receiving the lab reports at a central location, it is desirable to classify the lab reports and send the reports from lab X to Doctor A and to send the reports from lab Y to Doctor A. Similarly, in the context of invoice or purchase order (PO) processing, it is desirable to classify the invoices according to the vendors and the POs according to the customers.

The documents can be received both electronically and in the paper form. In order to perform computerized classification of documents, paper-form documents may be scanned to generate their electronic versions. The scanned documents or even the original electronically received documents sometimes do not disclose, at least readily, the identity of the document source, e.g., the lab name, vendor name, etc. For example, such information may be lost while zooming in during scanning so as to display certain other information in the document more clearly. A large document may be split into different parts that are analyzed separately, where the source information may be retained only in some parts (e.g., the first or the last page only), but would not be available in other parts. In some cases, the source information is unavailable because it is provided in the form of a logo that does not identify the source of the document in a textual form. The unavailability of source information can make the above-described task of classification of the document challenging. Extraction of additional information from the document can also become challenging.

SUMMARY

Methods and systems for clustering documents based on their layout structure are disclosed. According to one embodiment, a method includes accessing a number of documents, and identifying in each of the documents pairs of character segments. The method also includes generating a map of unique identified segment pairs across all documents in the several documents. The method further includes generating for each of the several documents a respective feature vector based on one or more unique pair of segments in the map that are also identified in the document, and clustering the plurality of documents into a plurality of clusters, using the feature vectors.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings:

FIGS. 1A and 1B show examples of two different invoice templates that have identical or similar keywords, where such templates can be distinguished according to various embodiments;

DETAILED DESCRIPTION

Figure 2:
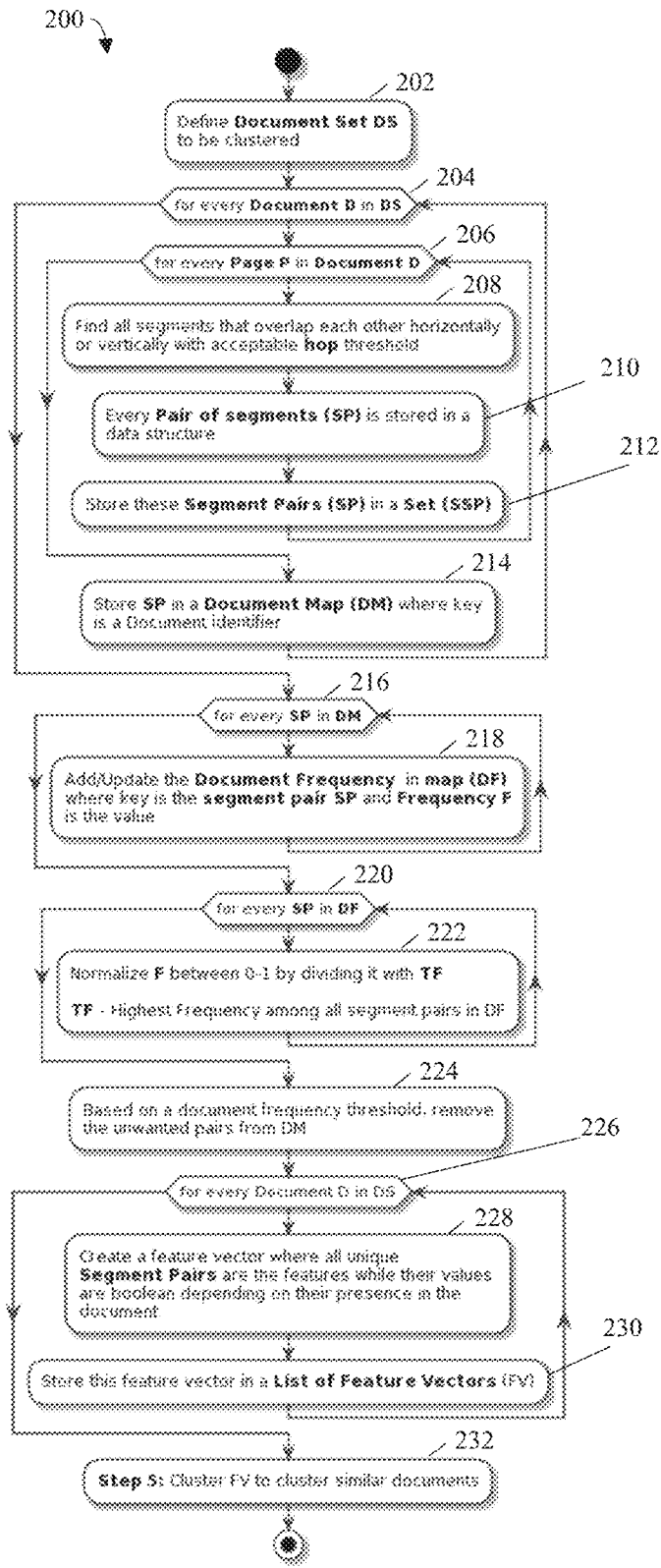
FIG. 2 is a flow chart of a layout based clustering process, according to various embodiments.

The following disclosure provides different embodiments, or examples, for implementing different features of the subject matter. Specific examples of components and arrangements are described below to simplify the present disclosure. These are merely examples and are not intended to be limiting.

For the sake of simplicity of explanation and brevity, the discussion below uses concrete examples of invoices of documents that are clustered and classified. The clustering techniques that are described herein are not limited, however, to classifying invoices only. They can be used to classify any types of documents, such as product manufacturing recipes, lab reports, bank statements, etc.

As noted above, when the source information of a document, such as the name/identity of the lab that provided the lab report, the name/identity of the vendor that provided an invoice, etc., are not known and cannot be detected readily in the document, classifying the document can become challenging. Extracting information from the document can also become challenging because many information-extraction systems, whether statistical or rule based, are designed to take advantage of a known template structure of the document but, without the classification, the template structure of the document may not be known.

A solution described below to the above-described problem takes advantage of the fact that many documents that need to classified are semi-structured documents. A semi-structured document, also referred to as a self-describing document, includes data presented in a structured manner, e.g., in tables, in frames on a page, etc., but the document structure is in the form of its layout and does not necessarily adhere to a formal structure of a database. Thus, in various embodiments a document is classified based on the layout of information in the document and/or the look and feel of the document, and not solely on the basis of an analysis of the words in the document.

In some embodiments, several documents are analyzed based on their respective layouts and are then clustered based on the layouts. Subsequent information extraction from a document may rely on the layout clues to extract information from different parts of the document, where the layout clues are provided by the clustering because each cluster is generally associated with a particular respective layout. For example, in case of invoices, it may be known that elements such as the payment due date, amount due, on-account balance, etc., can be found at particular respective locations on a page. Likewise, in a pathology lab report, it may be known that certain chemicals and their concentrations are listed in particular respective locations on a page. The knowledge of this information, which may be obtained from clustering in various embodiments, can both expedite information extraction and can also minimize errors in information extraction.

Layout-based information extraction can distinguish between two documents even when they have similar keywords. FIGS. 1A and 1B illustrate this feature in the case of two different invoice templates that have nearly identical keywords. It is not the keywords themselves, but the layout of these keywords that distinguishes between the two different templates. Specifically, Template 1 (100) shown in FIG. 1A includes the keywords "First Name:" 102, "Last Name:" 104, and "Address:" 106. Template 1 (100) also includes a table 108 that includes the columns "Sr. No." 110, "Item Description" 112, "Qty" 114, and "Cost" 116.

Template 2 (150) shown in FIG. 1B includes the keywords "First Name:" 152, "Last Name:" 154, that are identical to the keywords 102, 104 in Template 1 (100) (FIG. 1A). Referring again to FIG. 1B, the keyword "City" 156 in Template 2 (150) is similar in meaning to the keyword "Address" 106 in Template 1 (100) (FIG. 1A). Likewise, the table 158 in Template 2 (150) (FIG. 1B) is similar to the table 108 in Template 1 (100) (FIG. 1A). In particular, the first two columns of the table 158 (FIG. 1B), i.e., "Sno." 160 and "Product Details" 162 are similar in meaning to the first two columns "Sr. No." 110 and "Item Description" 112, respectively, of the table 108 in Template 1 (100) (FIG. 1A). Moreover, the last two columns of the table 158 (FIG. 1B), i.e., "Qty" 164 and "Cost" 166 are identical to the last two columns "Qty" 114 and "Cost" 116, respectively, of the table 108 in Template 1 (100) (FIG. 1A). In this example, the different ways in which certain keywords (also called form fields) are arranged and the fact that the tables in the two templates 100, 152 have somewhat different column headers, can be used in some embodiments to distinguish between these two templates.

FIG. 2 is a flow chart of a layout based clustering process 200 used in various embodiments. In step 202, a set (denoted DS) of semi-structured documents to be clustered is defined or generated. The documents in the set DS may be received electronically or paper documents may be scanned. Optical character recognition (OCR) may be applied to the scanned documents. In step 204, each document D in the set DS is selected for processing, and in step 206, each page P of the selected document D is selected for processing, as described below.

In step 208, for a selected page P, all segments that overlap horizontally, within an acceptable specified, horizontal hop threshold, may be detected. Alternatively, or in addition, all segments that overlap vertically within an acceptable, specified vertical hop threshold may be detected in step 208. As used herein, a segment is a group of characters (e.g., words or sequence of alpha-numeric characters) in a line with no more than a regular space (e.g., the space produced by one or two strokes of the spacebar on a keyboard) between the words or character sequences. The layout information associated with a segment includes the position and size of the group, as described below. Two or more segments are said to overlap horizontally if such segments have the same Y-coordinate. Put differently, the horizontally overlapping segments are found on the same horizontal line. Similarly, two or more segments are said to overlap vertically if they have the same X-coordinate, i.e., they are found on the same vertical line. A pair of segments may be considered overlapping even when one or more words or non-space characters are detected in-between the two segments of the pair. The number of intervening non-space characters (e.g., words) allowed (e.g., 0, 1, 3, 5, etc.) is referred to as a hop. The horizontal and vertical hops can be the same or they can be different, and these hops are configurable by the user in some embodiments.

Figure 3:
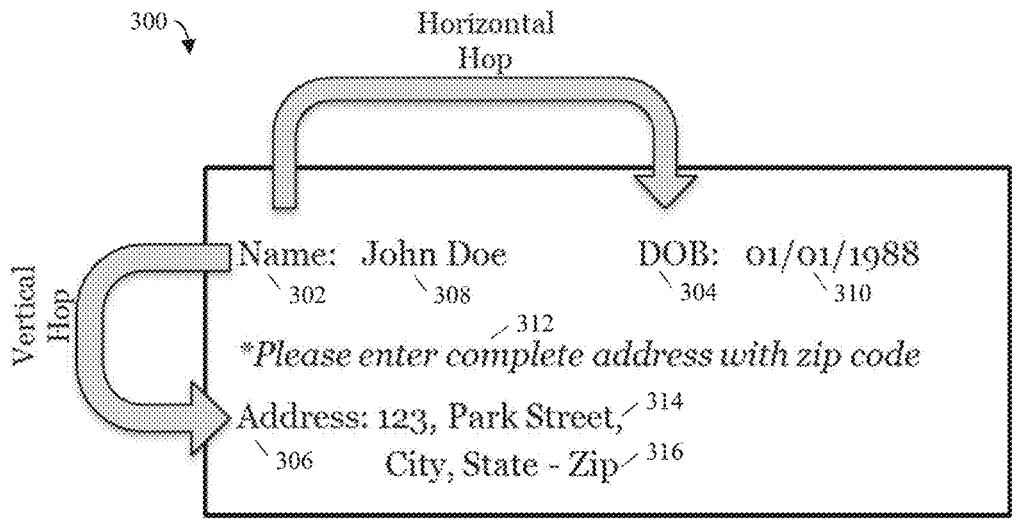
FIG. 3 illustrates horizontal and vertical hops in an example segment pair.

FIG. 3 illustrates horizontal and vertical hops. In particular, a document 300 shown in FIG. 3 includes the keywords "Name:" 302; "DOB:" 304; and "Address:" 306. Each of these keywords is considered a segment. In addition, the sequence of words "John Doe" 308; "01/01/1988" 310; "*Please enter complete address with zip code" 312; "123, Park Street," 314; and "City, State—Zip" 316, may also be considered words or character sequences, and/or segments. In document 300, a horizontally overlapping segment pair "Name:—DOB:" can be formed with a horizontal hop of two segments (e.g., two words ("John Doe" 308), or two groups of words), and a vertically overlapping segment pair "Name:—Address:" can be formed with a vertical hop of one word.

A segment pair such as "Name:—DOB:" can be stored as a data structure that includes the two segments of the pair (i.e., "Name:" and "DOB:" in the foregoing example), and layout information for the segment pair. The layout information may include the starting location of the first segment on the page of the document on which the pair is present, and the size (typically described in terms of the length and width) of the pair. The starting location can be the location of the top-left or the bottom-left corner of the first segment, and the starting location and size can be specified in terms of any suitable distance unit (e.g., mm, cm, inch, etc.) or in terms of pixels. Alternatively, the layout information may include the co-ordinates of a bounding box around the segment pair, where the co-ordinates may be specified in terms of any distance unit or pixels.

Referring again to FIG. 2, in step 210, pairs of all the detected segments are evaluated and, each pair of segments SP is stored in a data structure, along with its location and size information. In some embodiments, the data structure includes two segments denoted "s1" and "s2" and a flag indicating whether the segments overlap horizontally or vertically. The data structure may also store the value of a variable "document frequency" (discussed below) where the initial value can be "1." In step 212, the segment pair SP is added to set SSP of unique segment pairs. In other words, if a segment pair SP already exists in the set SSP, it is not added to the set again. Steps 208-212 are repeated for each page P in a selected document D. If the same segment pair SP is found on two different pages, that pair may be added to the set SSP only once.

In step 214, after all pages in a selected document D are processed, a document map DM:<DID, SSP> is created. A map in general is a key-value pair and, in the document map DM, the key is the document identifier (DID) and the value is the set of segment pairs SSP. The above-described process steps, i.e., step 214 and steps 206-212 are repeated for all the documents in the set DS. At the end of the last iteration of step 214, a complete document map DM is formed for all of the documents in the set DS.

To illustrate, suppose the set DS includes 3 documents, X, Y, and Z, having document identifiers D1, D2, and D3, respectively. Also suppose that these documents have the following unique segment pairs as shown in Table 1 below.

TABLE 1

Example of Unique Segment Pairs in Documents

| Document Name | Document ID | No. of Unique Segment Pairs | Unique Segment Pairs |
|---|---|---|---|
| X | D1 | 4 | $SSP_1 = \{SP_1, SP_2, SP_3, SP_4\}$ |
| Y | D2 | 3 | $SSP_2 = \{SP_2, SP_4, SP_5\}$ |
| Z | D3 | 5 | $SSP_3 = \{SP_1, SP_2, SP_4, SP_5, SP_6\}$ |

Table 1 shows that Document Y does not have segment pairs $SP_1$ and $SP_3$ that Document X has, and that Document X does not have segment pair $SP_5$ that Document Y has. Likewise, Document Z has two segment pairs ($SP_2$ and $SP_4$) in common with both Documents X and Y; one other segment pair ($SP_1$) in common with Document X alone; one other segment pair ($SP_5$) in common with Document Y alone; and a segment pair ($SP_6$) that is unique to Document Z. Accordingly, in this example, the Document Map (DM) can be represented as:

$$DM \equiv \left\{ \begin{array}{c} \langle D1, SSP_1:\{SP_1, SP_2, SP_3, SP_4\}\rangle \\ \langle D2, SSP_2:\{SP_2, SP_4, SP_5\}\rangle \\ \langle D3, SSP_3:\{SP_1, SP_2, SP_4, SP_5, SP_6\}\rangle \end{array} \right\}$$

In step 216, each segment pair SP in the document map DM is accessed in a respective iteration, and in step 218, the document frequency of that segment pair is updated (or computed, if not initialized earlier). The document frequency of a segment pair indicates the total number of documents in which that pair was found. Steps 216 and 218 are performed for all segment pairs in the document map DM. Thus, in the foregoing example, the document frequencies would be updated or computed as shown in Table 2 below.

TABLE 2

Example of Document Frequencies

| Segment Pair | Occurs in Documents | Document Frequency |
|---|---|---|
| $SP_1$ | X, Z | 2 |
| $SP_2$ | X, Y, Z | 3 |
| $SP_3$ | X | 1 |
| $SP_4$ | X, Y, Z | 3 |
| $SP_5$ | Y, Z | 2 |
| $SP_6$ | Z | 1 |

Table 2 also shows that the maximum document frequency (denoted F*) is 3, for segment pairs $SP_2$ and $SP_4$. The document frequencies may be stored in a document frequency map DF:<SP, f>, where the key for the map is the segment pair SP and the value is the updated/computed document frequency, denoted f.

In step 220, each segment pair SP in the document map DM is accessed again in a respective iteration, and in step 222, the document frequency of that segment pair is normalized to a range between (0, 1] by dividing the frequency of the segment pair by the maximum document frequency (denoted F*) across all segment pairs in the document map DM. Steps 220 and 222 are performed for all segment pairs in the document map DM. The normalized frequencies can also be computed as a percentage, by the formula:

$$\text{Normalized Frequency} = f' = \left(\frac{f}{F^*}\right) * 100$$

where f is the updated/computed document frequency of the segment pair SP and F* is the maximum observed document frequency across all segment pairs in the document map DM.

Thus, in the foregoing example, the normalized document frequencies would be computed as shown in Table 3 below.

TABLE 3

Example of Normalized Document Frequencies

| Segment Pair | Normalized Document Frequency |
|---|---|
| $SP_1$ | 66.67% |
| $SP_2$ | 100% |
| $SP_3$ | 33.33% |
| $SP_4$ | 100% |
| $SP_5$ | 66.67% |
| $SP_6$ | 33.33% |

After the normalized document frequencies are computed in step 222, the segment pairs that have a low frequency may be removed from the document map DM in step 224. The frequency of a segment pair is considered to be low if it is at or less than a user specifiable threshold. The threshold can be specified as a percentage (e.g., 80%, 75%, 50%, 40%, 15%, etc.) or as a number between [0 and 1]. Thus, when step 224 is completed, the document map DM would include those segment pairs that have a high frequency of occurrence in the document set DS, where the frequency is considered high if it is at or above the specified threshold.

In the foregoing example, if the selected threshold is 40%, the segment pairs $SP_3$ and $SP_6$ would be removed from the document map, and the revised document map would be:

$$DM \equiv \left\{ \begin{array}{c} \langle D1, SSP_1:\{SP_1, SP_2, SP_4\}\rangle \\ \langle D2, SSP_2:\{SP_2, SP_4, SP_5\}\rangle \\ \langle D3, SSP_3:\{SP_1, SP_2, SP_4, SP_5\}\rangle \end{array} \right\}$$

In step 226, each document in the set DS is selected in successive iterations. For a selected document, a feature vector (FV) is constructed in step 228. To construct a feature vector, all the segment pairs SPs remaining in the document map DM are visited in a certain order and a Boolean value (e.g., "0" or "1"; "True" or "False"; etc.) is assigned to each segment pair SP, based on whether that segment pair is present in the selected document. The feature vector for the document is stored in a list of feature vectors in step 230. The steps 226-230 are iterated for each document in the document set DS. Thus, in the foregoing example, the feature vectors for the three documents X, Y, and Z would be as shown in Table 4 below.

TABLE 4

Example Feature Vectors

| Document (FV) | Segment Pairs in DM | | | |
|---|---|---|---|---|
| | $SP_1$ | $SP_2$ | $SP_4$ | $SP_5$ |
| X: FV | T | T | T | F |
| Y: FV | F | T | T | T |
| Z: FV | T | T | T | T |

When a complete list of feature vectors is generated after processing all documents in the set DS, clustering of the feature vectors is performed in step 232 using one or more known clustering techniques. Examples of such clustering techniques include, but are not limited to k-means clustering, mean-shift clustering, expectation-maximization (EM) clustering using Gaussian mixture models (GMM), agglomerative hierarchical clustering, etc.

As part of clustering in step 232, the feature vectors in the list of feature vectors are partitioned into a selected number of clusters. In some clustering techniques, such as the k-means clustering, the user specifies or selects the number of clusters (denoted k). In other clustering techniques, such as mean-shift clustering, an optimized number of clusters is selected automatically by the clustering technique. The documents in the document set DS are also clustered according to the clustering of their corresponding feature vectors. Each cluster is associated with a respective layout template, and the knowledge of that layout can be used for extraction of information from the document(s) belonging to the cluster.

It should be understood that although the foregoing example includes three documents and a total of six segment pairs, these numbers are illustrative only, and that, in general, the set of documents DS may include any number (e.g., 5, 10, 30, 200, 1500, etc.) of documents. Each document may include any number (e.g., 5, 8, 15, 30, etc.) of segment pairs and, collectively, all the documents in the set DS may include any number (e.g., 4, 20, 64, 100, 250, etc.) of segment pairs.

The application of the process 200 to the document templates 100 (FIG. 1A) and 150 (FIG. 1B) is discussed below. In one embodiment, a segment pair in a feature vector is described in the format: <Term1>$$<Term2>$$<H/V> where H/V represents whether the segments "Term1" and "Term2" in the pair overlap horizontally or vertically. For the templates 100, 150, the feature vectors are as shown in Table 5 below.

TABLE 5

Feature Vectors for Templates in FIGS. 1A and 1B

| | First Name $$Last Name $$V | Last Name $$Address $$V | Qty $$Cost $$H | First Name $$Last Name $$H | Last Name $$City $$H |
|---|---|---|---|---|---|
| Template 1 | Y | Y | Y | N | N |
| Template 2 | N | N | Y | Y | Y |

In some cases a semi-structured document is obtained as a hypertext markup language (HTML) document or page by accessing a website. A script that can analyze such a document (e.g., a javascript) may be used to find the locations and dimensions of various tags in the HTML document/page. For a particular tag, its location and dimensions can be obtained by accessing the left, top, width, and height properties of the tag. Tags that usually encompass segments include (but are not limited to): <TD>, <P>, <SPAN>, <DIV>, etc.

Thus, in some embodiments, the identification of segments in an HTML document/page includes parsing the HTML document/page using a script (e.g., a javascript such as Selenium) that can be executed in a headless mode (i.e., without needing a graphical user interface (GUI). Tags that contain textual information are detected and selected during the parsing. For each selected tag, its position and dimensions are accessed, to obtain location information for different segments in the HTML document/page. Once the individual segments in an HTML document/page are detected and the respective location information for each segment is obtained, segment pairs can be generated using the specified horizontal and/or vertical hops. The process 200 (FIG. 2) can thus be applied to a set of documents that includes HTML documents/pages, to cluster such documents/pages.

Figure 4:
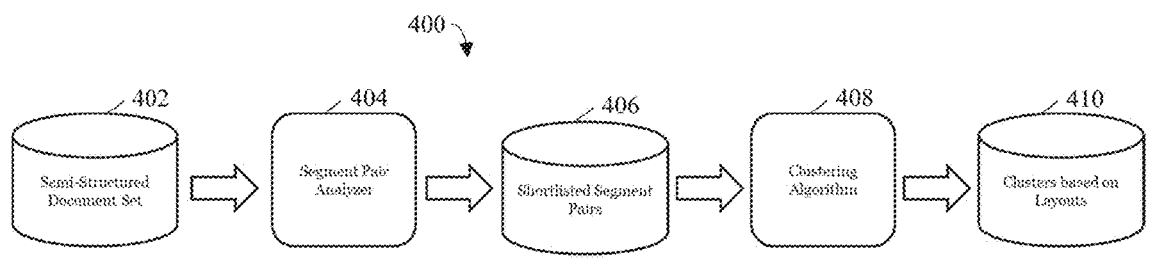
FIG. 4 depicts a system for clustering semi-structured documents according to various embodiments.

FIG. 4 shows the main stages of a system 400 for clustering semi-structured documents according to various embodiments. A set of documents DS is obtained from a database/datastore 402. A segment pair analyzer 404 then analyzes the documents and selects certain segments pairs that occur at a high frequency, e.g., as described in steps 202-224 of the process 200 (FIG. 2). These segment pairs may be stored in the same or a different database 406. A processor 408 generates feature vectors for the selected segment pairs, e.g., as described in steps 226-230 of the process 200 (FIG. 2). In some embodiments, the segment pair analyzer 404 may generate and store the feature vectors.

Thereafter, the processor 408 performs clustering of the feature vectors using a selected, known clustering technique (such as those described above), and designates the feature vectors to different clusters. The documents in the dataset are then designated by the processor 408 to different clusters based on the partitioning of their respective feature vectors. Each cluster corresponds to a respective, particular layout structure that can be stored as a template layout. The template layout for a particular cluster is based on the layout information of each of the segment pairs in the feature vector associated with that particular cluster. In general, the template layouts associated with different clusters are different, even when certain keywords in different templates are identical or similar in meaning (such as, e.g., templates 100 and 150 shown in FIGS. 1A and 1B). The template layouts associated with a particular cluster can be used to extract information from the documents belonging to that cluster. The clusters, along with their respective layout templates, may be stored in a database/datastore 410.

Figure 5:
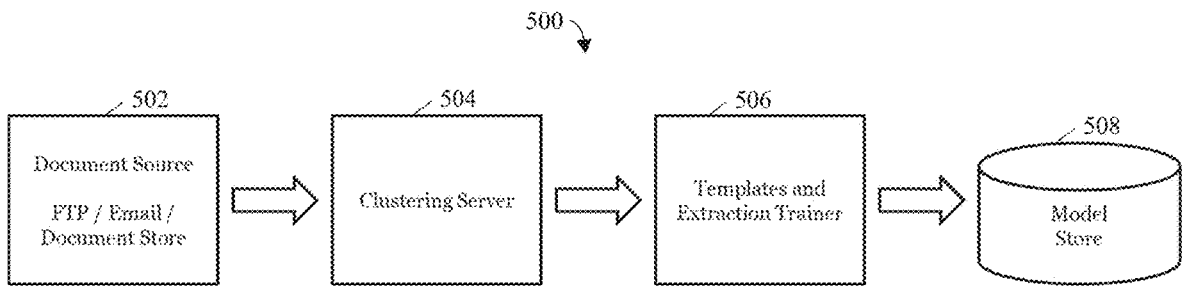
FIG. 5 shows a system for training artificial intelligence (AI) based/machine learning (ML) systems for information extraction based on a document layout, according to some embodiments.

FIG. 5 schematically shows a system 500 for training artificial intelligence (AI) based/machine learning (ML) systems for information extraction based on a document layout. The system 500 can read documents from different sources 502 such as file transfer protocol FTP server(s), email, document store(s), websites, etc. The sources of documents also include scanned images that may be processed using an OCR system. In some embodiments, all of the documents to be analyzed are first converted into documents of one or more formats in which format positional information of the words in the document (content, in general) can be deduced. Examples of such formats include the portable document format (PDF) and hyper-text markup language (HTML) format.

The document/segment-pair analysis and clustering functionality may be implemented by a clustering server 504, that can be accessed via an application program interface (API). The clustering server 504 may receive or access all the documents and may provide a clusters of documents. As noted above, each cluster generally corresponds to a respective, particular document layout template. A training system 506 or the clustering server 504 may generate respective layout templates for each cluster. Thereafter, for each cluster and the corresponding layout template, the training system 506 may train one or more AI/ML systems to perform layout-based information extraction from documents using that particular layout template. As such, different AI/ML systems may be trained to extract different fields (e.g., a vendor name, address, a value of a parameter such as blood glucose, a part number in a machine schematic, etc.) as specified by different layout templates, or the same fields but in different locations on a page, as specified by the different layout templates. The resulting ML models may be stored in a model store 508 for subsequent extraction of information from the documents in the analyzed data set or other documents, as well.

A newly received document can be analyzed, e.g., according to the process 200 (FIG. 2), where the feature vector of the document can be used to identify the cluster to which the document belongs. Then, the model of an ML-system trained using the layout template associated with the identified cluster can be used to configure an AI/ML system for information extraction, and information from the document can be extracted using that AI/ML system.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept.

What is claimed is:

1. A method for classifying semi-structured documents, the method comprising:
    accessing a plurality of documents including the semi-structured documents;
    identifying segment pairs in each of the plurality of documents, wherein each segment pair includes two segments separated by a hop, wherein the two segments are on a same horizontal line or on a same vertical line, the hop includes one or more non-space characters and corresponds to a distance between the segments of the segment pair, and the hop is not part of the segment pair;
    generating, based on the identified segment pairs and the distance between the segments of each segment pair, a map of unique segment pairs across all documents in the plurality of documents;
    generating for each of the plurality of documents a respective feature vector based on one or more unique segment pairs in the map that are also identified in the document; and
    clustering the plurality of documents into a plurality of clusters, using the feature vectors.

2. The method of claim 1, further comprising, prior to the generating step:
    computing for each unique segment pair in the map a normalized document frequency; and
    removing from the map the segment pairs having a frequency less than a specified threshold.

3. The method of claim 1, further comprising:
    associating a respective layout template for each cluster in the plurality of clusters, the layout template for a particular cluster being based on:
        one or more segment pairs corresponding to feature vectors associated with that particular cluster; and
        the respective layout information of each of the one or more segment pairs.

4. The method of claim 3, further comprising, for each cluster in the plurality of clusters:
    training a respective machine-learning (ML) information extractor to extract document information using the respective layout template associated with each cluster; and
    generating and storing a respective ML model based on training the ML information extractor.

5. The method of claim 3, further comprising:
    selecting a particular document from the plurality of documents;
    determining a cluster in the plurality of clusters to which the particular document belongs; and
    using a machine-learning (ML) information extractor, trained using the respective layout template associated with the determined cluster, to extract document information.

6. The method of claim 1, wherein for each document in the plurality of documents, the step of identifying the segment pairs in the document is performed for each page in the document.

7. The method of claim 1, further comprising storing each segment pair in a data structure along with layout information.

8. The method of claim 7, wherein the layout information includes a location and a size of the segment pair, or co-ordinates of a bounding box around the segment pair.

9. The method of claim 1, wherein each document in the plurality of documents is obtained via file transfer, email, web access, or scanning of a physical document.

10. The method of claim 1, wherein the plurality of documents comprises a hyper-text markup language (HTML) document, the identification of segment pairs in the HTML document comprising:
    identifying HTML tags representing textual information by parsing the HTML document using a script executable in a headless mode; and
    accessing location and size information of the HTML tags.

11. The method of claim 1, wherein the plurality of documents comprises a plurality of invoices.

12. A system for classifying semi-structured documents, the system comprising:
a processor; and
a memory in communication with the processor and comprising instructions which, when executed by the processor, program the processor to:
access a plurality of documents including the semi-structured documents;
identify segment pairs in each of the plurality of documents, wherein each segment pair includes two segments separated by a hop, wherein the two segments are on a same horizontal line or on a same vertical line, the hop includes one or more non-space characters and corresponds to a distance between the segments of the segment pair, and the hop is not part of the segment pair;
generate, based on the identified segment pairs and the distance between the segments of each segment pair, a map of unique segment pairs across all documents in the plurality of documents;
generate for each of the plurality of documents a respective feature vector based on one or more unique segment pairs in the map that are also identified in the document; and
cluster the plurality of documents into a plurality of clusters, using the feature vectors.

13. The system of claim 12, wherein the instructions further program the processor to, prior to the generate operation:
compute for each unique segment pair in the map a normalized document frequency; and
remove from the map the segment pairs having a frequency less than a specified threshold.

14. The system of claim 12, wherein the instructions further program the processor to:
associate a respective layout template for each cluster in the plurality of clusters, the layout template for a particular cluster being based on:
one or more segment pairs corresponding to feature vectors associated with that particular cluster; and
the respective layout information of each of the one or more segment pairs.

15. The system of claim 14, wherein the instructions further program the processor to, for each cluster in the plurality of clusters:
train a respective machine-learning (ML) information extractor to extract document information using the respective layout template associated with each cluster; and
generate and store a respective ML model based on training the ML information extractor.

16. The system of claim 14, wherein the instructions further program the processor to:
select a particular document from the plurality of documents;
determine a cluster in the plurality of clusters to which the particular document belongs; and
configure the processor as a machine-learning (ML) information extractor, trained using the respective layout template associated with the determined cluster, to extract document information.

17. The system of claim 12, wherein for each document in the plurality of documents, the operation of identifying the segment pairs in the document is performed for each page in the document.

18. The system of claim 12, wherein the instructions further program the processor to store each segment pair in a data structure along with layout information.

19. The system of claim 18, wherein the layout information includes a location and a size of the segment pair, or co-ordinates of a bounding box around the segment pair.

20. The system of claim 12, wherein each document in the plurality of documents is obtained via file transfer, email, web access, or scanning of a physical document.

21. The system of claim 12, wherein:
the plurality of documents comprises a hyper-text markup language (HTML) document, and
to identify the segment pairs in the HTML document, the instructions program the processor to:
identify HTML tags representing textual information by parsing the HTML document using a script executable in a headless mode; and
access location and size information of the HTML tags.

22. The system of claim 12, wherein the plurality of documents comprises a plurality of invoices.

* * * * *